United States Patent [19]

Flagg

[11] Patent Number: 4,568,932
[45] Date of Patent: Feb. 4, 1986

[54] METHOD AND APPARATUS FOR OBTAINING HIGH RESOLUTION SUBSURFACE GEOPHYSICAL MEASUREMENTS

[75] Inventor: Jack J. Flagg, Houston, Tex.

[73] Assignee: Dresser Industries, Inc., Dallas, Tex.

[21] Appl. No.: 441,015

[22] Filed: Nov. 12, 1982

[51] Int. Cl.$^4$ ............................................. G01V 1/40
[52] U.S. Cl. ..................................... 340/853; 340/861; 340/857; 364/422
[58] Field of Search ............... 340/853, 857, 858, 860, 340/861; 364/422; 73/151; 367/25, 26

[56] References Cited

U.S. PATENT DOCUMENTS

| | | | |
|---|---|---|---|
| 3,533,728 | 1/1971 | Frank et al. | 324/78 |
| 3,657,694 | 4/1972 | Lindsey | 340/858 |
| 3,977,245 | 8/1976 | Clerk et al. | 73/151 |
| 3,991,611 | 12/1976 | Marshall, III | 73/151 |
| 4,040,002 | 8/1977 | Durand | 340/18 |
| 4,355,310 | 10/1982 | Belaigues et al. | 340/858 |

OTHER PUBLICATIONS

A/DVISOR, National Semiconductor, vol. 2, No. 1, Apr., 1981, pp. 1-6.
Technical Memo, Quartz Pressure Gauge System, Model 2811B; Hewlett–Packard, Section I, pp. 1-1, 1-2, 1-4; Section III, pp. 3-1, 3-5, and 3-8; Section IV, pp. 4-1, 4-3; Section V, p. 5-24; Section IV, p. 6-3.

Primary Examiner—Nelson Moskowitz
Assistant Examiner—Ian J. Lobo
Attorney, Agent, or Firm—Patrick H. McCollum; Richard M. Byron

[57] ABSTRACT

A subsurface geophysical parameter measurement is converted downhole to a first pulse train whose instantaneous frequency is a function of the parameter value. In response to a first control signal, a first counter begins a first count of pulses from the first pulse train, and a second counter begins a count of second pulses from a downhole reference oscillator. The first and second counts are terminated in response to a second control signal and the first and second counters are interrogated. A ratio is then developed between the first and second counts which is functionally related to the value of the parameter.

17 Claims, 2 Drawing Figures

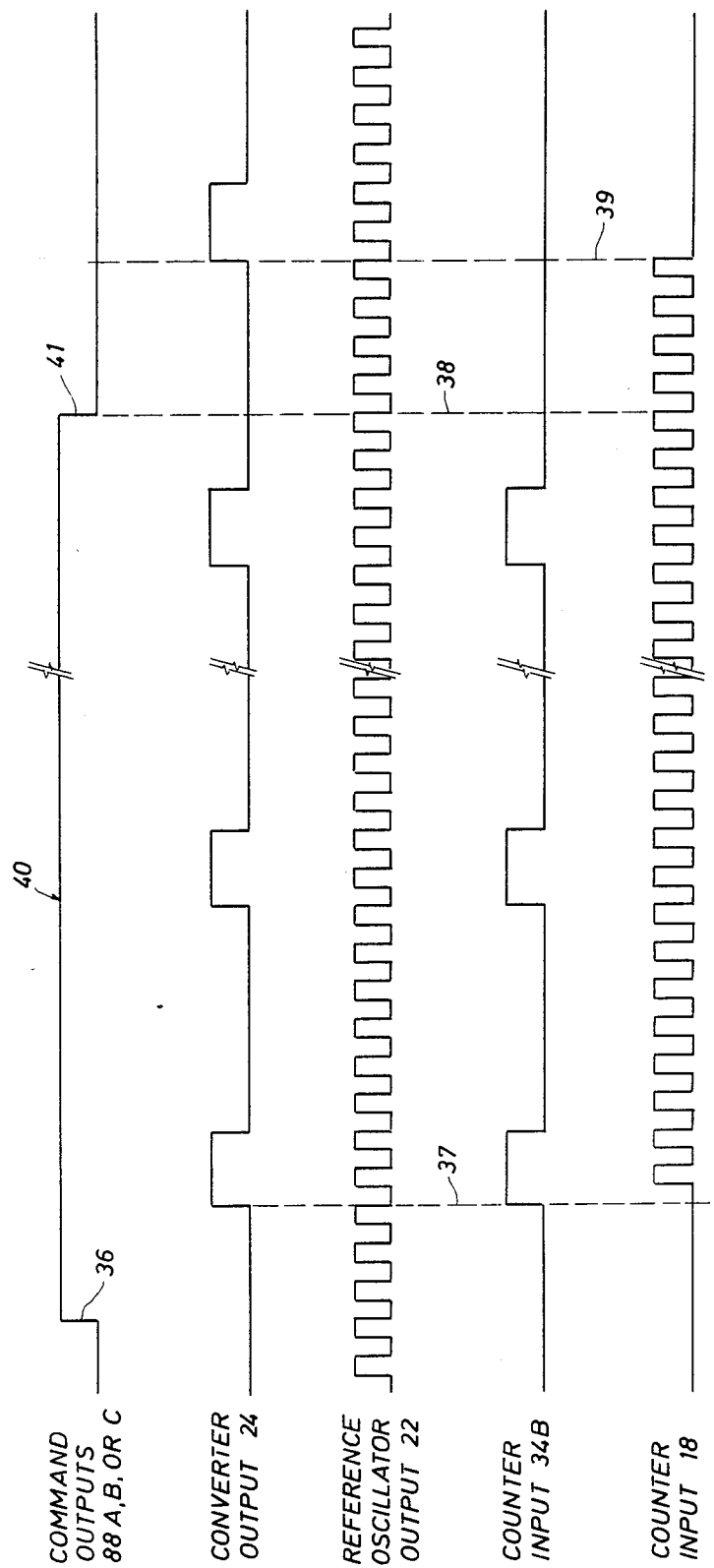

METHOD AND APPARATUS FOR OBTAINING HIGH RESOLUTION SUBSURFACE GEOPHYSICAL MEASUREMENTS

BACKGROUND OF THE INVENTION

It has long been desirable throughout the history of geophysical exploration to measure subsurface parameters such as pressure or temperature gradients as a function of depth with an extremely high degree of resolution, at times even approaching the order of 1 part per million. Accordingly, many widely varying solutions to the difficult problems associated with achieving high resolution subsurface measurements have been attempted with varying degrees of success.

One such solution has been to provide an extremely accurate parameter transducer downhole and to send the raw transducer output, after amplification, uphole via a conventional logging cable. However, this attempted solution has been fraught with numerous difficulties, not the least of which is the signal-to-noise-problems associated with transmission of the instrumentation signal along the logging cable, which is for example, susceptible to induced noise. This, in turn, is due to the long borehole increments associated with modern deep wells over which the cable is suspended—sometimes extending several miles into the earth formations. Yet another problem with such an approach was that the instrumentation signal would thus occupy the entire band width of the cable while the signal was being transmitted uphole in order to avoid cross-talk problems with other signals and the like.

In an effort to circumvent the aforementioned problems encountered in attempting to send the raw transducer signal uphole, it was suggested, particularly with the advent of modern analog-to-digital converters capable of withstanding the extremely deleterious environments associated with subsurface formations, that the transducer signals be converted downhole from analog-to-digital form. In theory, this solution appeared attractive in that once the parameter was digitized, modern digital telemetry systems could convey the information uphole without regard to deterioration due to signal to noise problems. Yet another apparent benefit to this approach seemed to be that by monitoring the signals downhole, and digitizing the results for transmission uphole, significant reductions could be achieved in cable band width dedication which has become extremely valuable with the growth in complexity and number of downhole measurments being made with modern logging systems. However, in practice, this approach also proved to be unsatisfactory simply because the state of the art in analog to digital converters suitable for downhole applications has not provided such a converter capable of resolutions on the order of one part per million.

Yet another approach to the problem of obtaining highly accurate subsurface measurement resolution has been attempted as represented typically in a commercially available Model 2811B Quartz Pressure Gauge System manufactured by Hewlett-Packard. In this approach a quartz pressure-sensitive probe is made to oscillate at a nominal resonant frequency in the megahertz range and is mixed with a quartz reference crystal oscillator to generate a different frequency between the 7 to 25 kilohertz frequency range (well within a modern well logging cable band width), whereby the precise difference frequency is a function of the pressure proximate the quartz pressure probe. This different frequency is placed upon the logging cable and by means of a phase locked loop on the surface is multiplied by a factor on the order of 70 for purposes of achieving a pressure sensitity of approximately 105 hertz per PSI. The output of the phase locked loop can be conventionally run to a general purpose frequency counter which may thus measure pressure changes as small as 0.01 PSI in a one second sample of the counter.

While relatively high resolutions may thus be made with the aforementioned approach, in applications wherein such a pressure measuring tool is being run in conjunction with other logging tools in need of cable time, and particularly when digital telemetry is available for encoding the other logging tool measurements for transmission uphole, it has been found most undesirable to have to dedicate a portion of the cable time to transmission of the frequency uphole which is varying as a function of pressure changes. Yet another drawback with such a hybrid approach, wherein digital telemetry data corresponding to data derived from some logging tools is transmitted uphole during one time interval and a frequency output from the pressure tool is transmitted during yet another time interval is that separate hardware is required at the surface for receiving the digital telemetry data on the one hand and the pressure signal on the other.

Thus, it may be appreciated that it would be highly desirable to provide a method and apparatus for measuring downhole various loging parameters with a high degree of resolution wherein the measurement could be encoded in a digital result amenable to transmission in a frame of digital data with other logging parameters. This would obviate the aforementioned problems of cable utilization caused by previous approaches wherein the high resolution data is sent directly uphole. At the same time it would further be highly desirable in such as system to obviate the hereinbefore noted need for an analog-to-digital converter downhole having the desired high resolution, which is practically unfeasible.

The disadvantages of the prior art including those hereinabove recited are overcome by the high resolution measurement methods and apparatus of the present invention.

SUMMARY OF THE INVENTION

This invention relates to high resolution measurement methods and apparatus adaptable for subsurface geophysical exploration and parameter measurements. In but one of its aspects, it relates more particularly to such methods and apparatus adapted for well logging applications wherein a digital word is derived downhole functionally related to the desired parameter measurement and is thus further adapted for transmission to the surface in a digital telemetry link.

In a logging sonde or the like disposed within a borehole, a voltage is developed from a transducer adapted to measure a desired geophysical parameter to the required degree of accuracy. The voltage is converted to a first pulse train by a conventional voltage to frequency converter whereby the instantaneous frequency of the pulse train is functionally related to the magnitude of the parameter in question. The pulse train is delivered through a first gate to a first counter. A highly stable reference oscillator generates a second pulse train of a known frequency which, in like manner, is delivered through a second gate to a second counter.

A control logic circuit is provided having a first output delivered to the first gate and a second output delivered to the second gate. The condition of the particular control logic outputs determines whether the first or second pulse train delivered to its respective first or second gate will be throughput to its corresponding first or second counter for counting. The control logic is further provided with an input control signal from an appropriate downhole microprocessor system controller for controlling the generation of the first and second control logic outputs. The control logic circuit is further provided with a second input from the first pulse train associated with the parameter to be measured.

A reset signal appearing on the first control logic input at the end of a previous reading of the first and second counters causes the control logic to generate the first control logic output signal. This, in turn, gates the first gate on so as to permit passage of the first pulse train through the first gate to the first counter. Upon arrival of the first pulse of the first pulse train this status is indicated to the control logic by means of the second control logic input line. This, in turn, causes the control logic to generate the second control logic output signal which gates the second gate on, thus permitting passage of the second pulse train through the second gate for counting by the second counter.

Both first and second counters proceed to count pulses from their respective first and second pulse trains delivered through their respective first and second gates (which have been enabled by corresponding first and second control logic outputs). These counters will continue counting until arrival of a counter read or stop command on the first control logic input from the microprocessor. The signals on the first control logic input which determine the time period during which the first and second counters accumulate counts may be preferably derived from the aforementioned downhole microprocessor controller in a manner to be hereinafter described.

Upon receipt of the stop command on the first control logic input, a next signal generated by the control logic on the first control logic output gates off the first gate whereupon no further pulses in the first pulse train are permitted to pass to the first counter for counting. Upon arrival of the next pulse on the first pulse train, this condition will be transmitted to the control logic by means of the second control logic input which is interconnected to the first pulse train. In response, the control logic generates a next signal on the second control logic output gating the second gate off, whereupon the pulses comprising the second pulse train are prevented thereafter from passing through the second gate to the second counter for counting.

The outputs of the first and second counters corresponding to their counts cumulated during the period controlled by the first control logic input are presented to an appropriate multiplexer whose output is to a data I/O bus interconnecting with the downhole microprocessor. Upon completion of the counting cycle, the microprocessor generates a command delivered to the muliplexer which will alternately place the cumulative count results of the first and second counters on the data bus for storage in memory associated with the downhole microprocessor. These digitized counts may thereafter be transmitted to the surface as part of a digital telemetry frame which may include other digitized measurements. In the alternative, under control of the microprocessor and downhole software, a ratio between the cumulative counts of the first and second counters may be derived by the microprocessor and transmitted uphole again as part of a digital telemetry word, said ratio being functionally related to the value of the parameter to be measured during the period of cumulation of the counts of the first and second counter.

It is an object of this invention to provide a new and improved method and apparatus for high resolution measurement of subsurface geophysical parameters.

It is another object of the present invention to provide such method and apparatus for deriving said measurement in digital form for transmission to the surface in conjunction with a digital telemetry system.

Yet another object of the present invention is to provide a method and apparatus for obtaining high resolution subsurface geophysical measurements with improved logging cable utilization.

It is still a further object of the present invention to provide such method and apparatus wherein the measurement is derived downhole by means of digital counters obviating the need for downhole analog-to-digital converters for converting the parameter measurement in question to digital form.

Yet another object of this invention is to provide methods and apparatus for deriving such measurement by means of two downhole counts accumulated during an integral number of periods of the first pulse train, wherein a first count corresponds to a pulse train whose frequency is functionally related to the value of the parameter to be measured and a second count corresponds to a count of a pulse train having a known reference frequency.

BRIEF DESCRIPTION OF THE DRAWINGS

These and other objects and advantages are hereinafter set forth in greater detail with reference to the drawings, wherein:

FIG. 2 is a timing diagram illustrating the operation of the apparatus of the present invention depicted in FIG. 1.

DETAILED DESCRIPTION OF THE INVENTION

Figure 1:
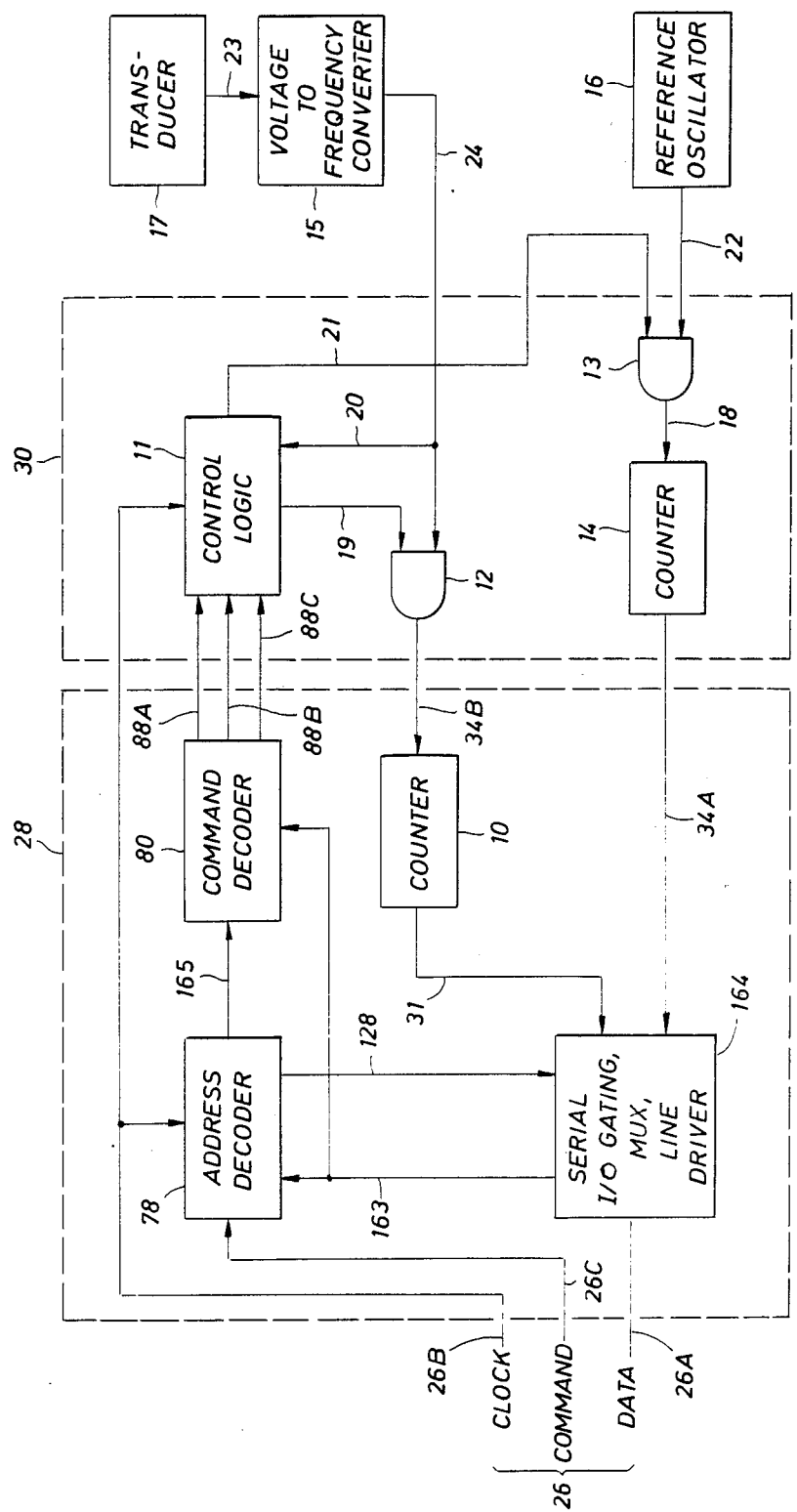
FIG. 1 is a functional block diagram depicting the high resolution measurement apparatus of the present invention.

Referring first to FIG. 1 there will be seen functionally depicted a remote unit interface 28 and high resolution timer 30 of the present invention. From the foregoing, it will be recalled that the present invention is particularly adapted to use in conjunction with a computerized well logging system of the type having a downhole controller such as a microprocessor disposed within the sonde, the purpose of which is to control the data acquisition and telemetry of various logging tools within the sonde interconnected on a common data I/O, command, and clock line bus.

In such a system it is highly desirable to provide a universal interface which may be disposed between the microprocessor and its bus line on the one hand and each of the logging tools comprising the logging string. My co-pending patent application entitled "Universal Interface Method and Apparatus for Subsurface Earth Formation Testing", filed on Nov. 12, 1982 and having a Ser. No. 441,017, discloses such an interface particularly suited to use in the present invention. Accordingly, the disclosure in the aforementioned patent application is herewith incorporated by reference in its entirety. The interface 28 depicted in FIG. 1 may be seen to be a simplified block diagram of the interface disclosed in the aforesaid patent application, and identifying numbers in FIG. 1 have been made to correspond in some instances to those of my co-pending patent application in order to more clearly indicate correspondence between the components, signals, and the like depicted therein to those of the present invention.

Thus, for example, a three state instrument bus 26 may be seen in FIG. 1 which corresponds to that of my co-pending patent application, and reference thereto will clearly reveal that the instrument bus, comprised of a data I/O bus 26a, a clock line 26b, and command line 26c are routed to a downhole controller (not shown in FIG. 1), preferably of the microprocessor variety for providing communication and control via the interface 28 to the particular logging tool with which the interface 28 is associated. A closer examination of FIG. 1 of the present invention will reveal that one difference from the applications of the interface 28 disclosed in my prior application is that in the present case rather than the interface being interposed between a logging tool and a downhole controller, it is interposed between the downhole controller and the aforementioned high resolution timer 30 of FIG. 1 whose purpose will be hereinafter described in more detail.

Still referring to FIG. 1 and the accompanying timing diagram of FIG. 2, a transducer 17 is preferably provided which may be of any desired type known in the art for converting logging parameters to voltages. The transducer 17 has a transducer output 23 which is delivered to an appropriate voltage-to-frequency converter 15, whose purpose is to convert the voltage generated by transducer 17 into a pulse train whose frequency varies as a function of the measurement derived by the transducer 17 in a conventional manner well known in the art. Thus, the converter output 24 which is delivered to the high resolution timer 30 of the present invention is a digital pulse train whose instantaneous frequency is directly related to the magnitude of the parameter measurement under investigation. Still referring to FIG. 1, it will be noted that this converter output 24 is routed through a conventional logic gate 12 which is gated on and off by a control logic output 19 from appropriate control logic 11. Pulses generated by converter 24 will thus pass through gate 12 and be available as gate output 34b to a counter 10, such passage through gate 12 being controlled by the control logic output 19 in a manner to be described.

It will further be seen from FIG. 1 that a reference oscillator 16 is also provided in the sonde, preferably of the crystal-controlled variety having the property that its reference frequency may be predetermined within an extremely precise range. The reference oscillator output 22, in like manner to converter output 24, is routed through a conventional digital logic gate 13 which also has delivered to it a control logic output 21 from control logic 11. The purpose of this output is, in like manner to that of output 19, to regulate the times during which digital pulses generated by oscillator 16 are permitted to pass by means of oscillator output 22 through gate 13 as gate output 18 to an appropriate counter 14.

It will be noted that the outputs 31 and 34a from respective counters 10 and 14 are routed to a serial I/O gating logic, multiplexer, and line driver function shown for convenience as block 164 whose output is delivered on the aforementioned data I/O bus 26a for delivery to the downhole controller (not shown). It may accordingly be appreciated then that, speaking very generally, the purpose of the apparatus depicted in FIG. 1 is to deliver on data I/O line 26a a first digital count within a certain time period corresponding to the pulse train frequency of converter 15 (which, in turn, corresponds to the magnitude of the parameter under measurement by transducer 17) and a second digital count within said period corresponding to the reference pulse train having a known frequency generated by oscillator 16. The precise manner in which this objective is achieved by the present invention will now be described hereinafter in more detail.

It will be recalled that in typical modern well logging applications, a plurality of logging tools comprising a tool string are generally operated at the same time during a traversal of the logging sonde through the borehole. However, as already hereinbefore noted, the various logging tools desirably share the same I/O bus 26, and thus means must be provided for permitting a downhole controller to selectively address under software control any one of the plurality of logging tools for purposes of control and data acquisition. Although the method and apparatus whereby this is achieved by the interface 28 has been described in more detail in my co-pending patent application, brief reference to FIG. 1 and the simplified block diagram of the interface 28 will clearly demonstrate how this is achieved.

When it is desirable to acquire data generated by the particular logging tool associated with the interface 28 and timer 30 of FIG. 1, e.g. when it is desirable to acquire a measurement of the parameter being measured by transducer 17, an appropriate command signal will be delivered on command line 26c instructing all of the interfaces 28 for each of the logging tools on the common I/O bus 26 that digital address and command "fields" will be forthcoming on data line 26a which will, in part, serve to grant the particular interface 28 associated with the address field thus transmitted exclusive interconnection on the I/O bus 26 for receipt of commands. Thus, upon occurrence of the command signal 26c, preferably an eight bit digital word on data line 26a will be delivered through block 164 on output 163 to an appropriate address decoder 78 (both the address decoder 78, control logic 11, and other synchronously operating circuits of FIG. 1 being clocked by a conventional clock line 26b), such that a five bit address field will reside in address decoder 78 and a three bit command field in command decoder 80. The address decoder 78 will compare the bits in the address field with a preselected address uniquely corresponding to the particular interface 28 and resident in the address decoder 78 by conventional address strapping means (not shown).

If correspondence is detected by address decoder 78 between the address field thus delivered on output 163 with the address strapping, this indicates that the particular remote interface 28 is being addressed by the downhole controller to the exclusion of all other such interfaces and their corresponding tools. Accordingly, an address decoder output 128 will grant exclusive access to the data I/O bus by interface 28 by generating a decoder output 128 which is delivered to block 164. A similar output 165 of decoder 78 will be delivered to command decoder 80 indicating that a valid address has been detected and that whatever commands appear encoded in the three bit command field residing in command decoder 80 are intended for that particular interface 28 and the circuitry interconnected thereto—in this case timer 30.

Thus, in general, it may be seen that under the control of timing of the downhole controller interconnected to the common I/O bus 26, a particular measurement function associated with interface 28 has been requested by the controller to perform a data acquisition and transmission function under the control of the various commands sent in the command field. These various $2^3$ or eight commands (a number arbitrarily selected for illustration purposes which may be increased obviously by increasing the number of bits in the command field) may be either entirely decoded, only a portion thereof decoded, or none of them decoded and their raw bits transmitted out of the decoder 80 (as depicted by means of decoder output 88a–c of FIG. 1) which are thence delivered to the aforementioned control logic 11 for purposes to be described.

The precise timing of the counting of the respective pulse trains on outputs 22 and 23 will not be described in more detail with reference to the timing diagram of FIG. 2. For purposes of simplicity of illustration, it may be assumed that the decoded command outputs of 88a, b, or c which are decoded by control logic 11 will generate a counter read sequence functionally illustrated by the step function signal 40 depicted in FIG. 2 having respective leading and trailing edges 36 and 41. For further purposes of simplicity of illustration, it may be assumed that the reference oscillator output 22 (depicted in FIG. 2) may be of a higher frequency than that of converter output 24 (also depicted in FIG. 2). When the control logic 11 detects the leading edge 36 of signal 40 from the command decoder outputs 88a–c, it will generate a control logic output signal 19 delivered to gate 12. This will turn gate 12 on to permit the gate 12 to begin passing any next occurring converter output pulses 24 through the gate 12 which will appear as counter inputs 34b to counter 10. Thus, it may be seen by vertical line 37 of FIG. 2 that a first such counter input 34b pulse occurs in co-alignment with line 37 after the leading edge 36 of signal 40. The counter 10 will thereafter begin accumulating the count of successive converter output 24 pulses thus passed through gate 12 until the gate 12 is gated off by control logic 19 at a time to be described later.

A closer examination of the timer 30 of FIG. 1 reveals that the converter output 24 pulses are also delivered on line 20 to the control logic 11. The control logic 11 is designed so as to not only detect the leading edge 36 of the illustrative counter read signal 40, but also to look for the first arrival of a converter output 24 pulse delivered on line 20 after the first leading edge 36 of counter read signal 40. When such successive occurrence is detected of leading edge 36 and the first converter output 24 pulse thereafter (which, as described, has been passed to counter 10 as gate output 34b), the control logic 11 will thence generate a next control logic output 21 delivered to gate 13.

This control logic output 21 will gate in the on condition gate 13 which will then permit passage of oscillator pulse train outputs 22 through gate 13. These outputs 22 will thence appear as gate output 18 which, in turn, will be cumulatively counted by counter 14. Thus, referring to FIG. 2, the bottom line thereof (with reference to the aforementioned vertical line 37) clearly indicates that the counter input 18 will appear after the successive occurrence of leading edge 36 of signal 40 and the first converter output 24 thereafter. This may further be seen by comparison of the timing diagram pulse trains of reference oscillator output 22 with those of counter input 18 wherein it will be seen that prior to vertical line 37 no such reference oscillator output pulses 22 pass through gate 13 for counting by counter 14.

Both counters 10 and 14 thence proceed cumulating counts from their respective pulse trains from converter output 24 and reference oscillator output 22 until such time as the trailing edge 41 of signal 40 occurs (again with reference to FIG. 2 and vertical line 38 thereof). This event, e.g., the trailing edge 41 of signal 40, gates off the input to counter 10. The control logic 11 will then, in like manner to its awaiting detection of the first converter output 24 after leading edge 36, await detection of the next converter output 24 following trailing edge 41 of signal 40. This first converter output pulse 24 after trailing edge 41 may be seen with its leading edge in alignment with vertical line 39 of FIG. 2.

Detection by control logic 11 of this first occurring converter output 24 pulse after the trailing edge 41 of signal 40 will generate a control logic output 21 delivered to gate 13, gating off this gate 13 so that no additional reference oscillator outputs 22 may be passed therethrough. This may be seen from the bottom line of the timing diagram of FIG. 2, wherein although after vertical line 39 additional reference oscillator output pulses 22 may be seen to occur, no such corresponding pulses appear in the counter input 18 line of the timing diagrams.

Thus, in summary, it will be appreciated that during the time interval corresponding to decoded command outputs 88a–c and further corresponding to pulse 40, counters 10 and 14 have been instructed to begin accumulating counts corresponding to their respective oscillators 15 and 16 upon occurrence of the first converter output 24 after the leading edge 36 of signal 40. Moreover, the counters 10 and 14 are thus controlled to discontinue their counts after the first leading edge of a converter output 24 first occurring after the trailing edge 41 of the signal 40. These counts accumulated in the aforementioned manner will thus be residing in storage in counter 10 and 14 at the conclusion of the counter read cycle functionally depicted by signal 40. The respective counts residing in counters 10 and 14 may thereafter be sequentially delivered in a manner well known in the art through block 164 and the line driver associated therewith on data I/O bus 26a to the downhole controller for delivery to the surface or for further numerical analysis prior thereto.

Two important features of the previously described method and apparatus may be noted in particular. First, it can be demonstrated that the unknown frequency of converter 15 corresponding to the unknown parameter magnitude being measured by transducer 17 is functionally related to the ratio of the converter output 24 frequency and that of the oscillator output 22 (assuming a stable reference oscillator 16), and that this will be so independently of the magnitude of the period represented by signal 40 (as long as the time between edges 36 and 41 is long enough to include at least one pulse on output 24). Moreover, selection of the period of signal 40 and thus the counter acquisition cycle time can be further shown to be desirably determined primarily by the resolution desired, e.g. all other things being equal, the longer the count acquisition time represented by signal 40, the higher the resolution of the measurement of transducer output 23 will be.

In one application of the present invention, it is commonplace to generate logging measurements at preselected depth increments within the borehole rather than as a function of time. Thus, a counter acquisition signal 40 typically would be produced as a function of preselected depth interrupt signals transmitted to the downhole microprocessor from the surface so as to insure a transducer 17 measurement for each such preselected desired depth interval. However, although the start of a counter acquisition cycle might thus desirably commence in functional relation to each such generated depth interrupt, the length of each time 40 for such cumulative counting may be adjusted only so as to insure that the counts run over a long enough period of time to achieve the desired resolution and conclude prior to generation of the next expected depth interrupt, which will occur as a function of logging speed.

In general, however, the beginning of command 40 may preferably commence as soon as counters 10 and 14 are able to be read from the previous acquisition cycle and cleared, and termination of command 40 may preferably be caused by the depth interrupt in order to allow a maximum time for command 40. Thus the sampling time, and so the resolution, may be increased if necessary by reducing the logging speed or increasing the interval between depth interrupts.

Thus, it will be appreciated that resolution can be maximized for any sampling or depth interrupt rate by simply allowing the counting to proceed up until the depth or time interrupt (actually, slightly beyond since one more signal pulse of converter output 24 is preferably required to gate the reference oscillator counter 14 in the off condition). Moreover, it will thus be further appreciated that not only is it unnecessary to predetermine the number of periods of either the converter output 24 or reference oscillator output 22 over which sampling will occur, but it is further unnecessary to predetermine the length of time of sampling. With this approach, higher resolution is automatically thus achieved simply by reducing the logging speed and, accordingly, frequency of depth interrupt.

It is thus fully contemplated as within the scope of the present invention that one need not count a preselected number of reference oscillator pulses within a predetermined period in order to measure the unknown transducer 17 output. Rather, one of the benefits of the present invention is that so long as the desired resolution is achieved, the circuitry of the present invention depicted in FIG. 2 will provide that a plurality of reference oscillator pulses may be counted within a variable integral number of converter output 24 periods, the exact number however of which need not predetermined.

The embodiments of the invention in which an exclusive property or privilege is claimed is defined as follows.

I claim:

1. A method of obtaining high resolution measurements of subsurface geophysical parameters with a logging tool traversing a borehole, whereby the obtainment of said measurements is interfaced with a subsurface controller generating a plurality of command signals, comprising the steps of:
   generating a measurement voltage signal corresponding to a well logging parameter;
   converting said measurement voltage signal to a first pulse signal having a frequency corresponding to said voltage;
   generating a second pulse signal having a preselected frequency;
   generating a control signal having first and second transitions in response to said command signals;
   counting pulses in said first and second pulse signals in response to said control signal; "wherein said step of counting pulses comprises the steps of: detecting a first pulse in said first pulse signal occurring after said first transition of said control signal, said first pulse having a first pulse first transition;
   detecting a second pulse in said first pulse siganal occuring after said second transition of said control signal, said second pulse having a second pulse first transition;
   counting pulses in said first pulse signal occurring between said first and second transitions of said control signal; and
   counting pulses in said second pulse signal occurring between said first and second pulse first transitions.
   deriving said measurements of said parameters in response to the counts of said first and second pulse signals.

2. The method of claim 1, further comprising the steps of:
   detecting the rate of traversal of said logging tool through said borehole; and
   adjusting the time between occurrence of said first and second transitions of said control signal in response to said rate of traversal.

3. The method of claim 2, wherein said generating a second pulse signal step further comprises the step of generating a second pulse signal having a preselected frequency higher in frequency than said first pulse signal.

4. The method of claim 3, wherein said deriving said measurements step comprises the step of deriving a ratio between said counted pulses in said first and second pulse signals as an indication of said subsurface geophysical parameters.

5. A method of obtaining high resolution subsurface parameter measurements with a well logging tool traversing a borehole, comprising the steps of:
   generating a first pulse signal having a frequency variable as a function of a subsurface parameter measurement;
   generating a second pulse signal having a preselected frequency;
   generating a control signal; "wherein said step of generating said control signal comprises the step of generating a control signal having a first and second transition"
   counting pulses in said first and second pulse signals in response to said control signal; "wherein said step of counting pulses comprises the steps of:
   detecting a first pulse in said first pulse signal occurring after said first transition of said control signal, said first pulse having a first pulse transition;
   detecting a second pulse in said first pulse signal occurring after said second transition of said control signal, said second pulse having a second pulse transition;
   counting pulses in said first pulse signal occuring between said first and second transitions of said control signals; and
   counting pulses in said second pulse signal occurring between said first and second pulse transitions;"
   deriving said parameter measurements from said count of said first and second pulse signals.

6. The method of claim 5, wherein said step of generating said control signal further comprises the steps of:
- detecting the rate of traversal of said logging tool through said borehole; and
- generating said control signal in response to said rate of traversal.

7. The method of claim 6, further comprising the step of adjusting the time of occurrence between said first and second transitions of said control signal as a function of said rate of traversal.

8. The method of claim 7, wherein said step of generating a first pulse signal comprises the steps of:
- generating a measurement voltage signal corresponding to said parameter measurement; and
- converting said measurement voltage to said first pulse signal having a frequency corresponding to said measurement voltage signal.

9. The method of claim 8, wherein said step of deriving said measurements comprises the step of deriving a ratio between said counted pulses in said first and second pulse signals as an indication of said measured parameter.

10. In a well logging tool, apparatus for obtaining high resolution parameter measurements of subsurface geophysical parameters, comprising:
- variable oscillator means for generating a first pulse signal having a frequency corresponding to a parameter measurement;
- reference oscillator means for generating a second pulse signal having a preselected frequency;
- first counter means for deriving a first count of said first pulse signal;
- second counter means for deriving a second count of said second pulse signal;
- first gating means interconnected between said variable oscillator means and said first counter means for gating said first pulse signal to said first counter means;
- second gating means interconnected between said reference oscillator and said second counter means for gating said second pulse signal to said second counter means;
- control logic means interconnected to said first and second gating means for generating control signals for controlling the gating of said first gating means for a first time interval and said second gating means for a second time interal, thereby controlling the delivery of said first pulse signal to said first counter means and said second pulse signal to said second counter means.

11. The apparatus of claim 10, further comprising interfacing means for communicating address and command signals generated by a subsurface controller means to said control logic means, and for communicating said first and second counts to said subsurface controller means from said first and second counter means.

12. The apparatus of claim 11, wherein said variable oscillator means comprises:
- transducer means for generating a voltage signal corresponding to a parameter measurement; and
- voltage to frequency converter means for converting said voltage signal to said first pulse signal.

13. The apparatus of claim 12, wherein said interfacing means comprises:
- address decoder means for decoding address signals generated by said subsurface controller means;
- command decoder means for decoding command signals generated by said subsurface controller means; and
- multiplexer means for delivering said first and second counts to said subsurface controller means.

14. The apparatus of claim 13, further comprising:
- means for detecting the rate of traversal of said tool through a borehole; and
- means for adjusting said control signals of said control logic means as a function of said detected rate.

15. A method of obtaining a high resolution measurement of the magnitude of a parameter, comprising the steps of:
- generating a first pulse signal having a variable frequency corresponding to the magnitude of said parameter;
- generating a second pulse signal having a preselected frequency;
- detecting a first pulse in said first pulse signal, said first pulse having a first pulse first transition;
- detecting a second pulse in said first pulse signal, said second pulse having a second pulse first transition;
- counting pulses in said first pulse signal to produce a first pulse count, said first pulse count comprising said first pulse and said pulses in said first pulse signal occurring between said first and second pulses;
- counting pulses in said second pulse signal to produce a second pulse count, said second pulse count comprising said pulses occurring in said second pulse signal between said first and second pulse first transitions; and
- deriving said measurements of said magnitude of said parameter from said first and second pulse counts.

16. The method of claim 15, wherein said deriving step comprises the step of deriving a ratio between said first and second pulse counts as an indication of said magnitude of said parameter.

17. The method of claim 16, wherein said step of generating a second pulse signal comprises the step of generating a second pulse signal having a preselected frequency higher in frequency than said first pulse signal.

* * * * *